United States Patent
Dahneke et al.

(10) Patent No.: US 7,330,913 B1
(45) Date of Patent: Feb. 12, 2008

(54) METHOD AND APPARATUS FOR MAINTAINING PERIPHERAL DEVICE SUPPORT INFORMATION

(75) Inventors: Bart Dahneke, Provo, UT (US); Ted Wayne Tronson, Provo, UT (US); Michael John Cowley, Provo, UT (US); Victor Hugo Parra, Lindon, UT (US)

(73) Assignee: Novell, Inc., Provo, UT (US)

( * ) Notice: Subject to any disclaimer, the term of this patent is extended or adjusted under 35 U.S.C. 154(b) by 824 days.

(21) Appl. No.: 10/073,571

(22) Filed: Feb. 11, 2002

(51) Int. Cl.
*G06F 3/00* (2006.01)

(52) U.S. Cl. .............................. 710/15; 710/8; 710/14; 710/16; 710/17; 710/18; 710/19; 719/321

(58) Field of Classification Search .................. 710/8, 710/9, 10, 11, 12, 13, 14, 15, 16, 17, 18, 19
See application file for complete search history.

(56) References Cited

U.S. PATENT DOCUMENTS

| | | | | |
|---|---|---|---|---|
| 5,434,562 | A * | 7/1995 | Reardon ..................... | 713/200 |
| 5,687,379 | A * | 11/1997 | Smith et al. ................ | 710/200 |
| 5,809,265 | A | 9/1998 | Blair et al. | |
| 6,167,538 | A * | 12/2000 | Neufeld et al. ............. | 714/47 |
| 6,618,772 | B1 * | 9/2003 | Kao et al. .................... | 710/15 |
| 6,697,884 | B1 * | 2/2004 | Katsch ........................ | 710/18 |
| 6,714,992 | B1 * | 3/2004 | Kanojia et al. ............. | 719/321 |
| 6,789,111 | B1 * | 9/2004 | Brockway et al. .......... | 709/222 |
| 6,825,941 | B1 * | 11/2004 | Nguyen et al. ............. | 358/1.15 |
| 6,859,924 | B1 * | 2/2005 | Kroening .................... | 717/173 |
| 2001/0037391 | A1 * | 11/2001 | West et al. .................. | 709/226 |
| 2002/0062287 | A1 * | 5/2002 | Katz et al. ................... | 705/51 |
| 2002/0065950 | A1 * | 5/2002 | Katz et al. ................... | 709/318 |
| 2002/0083431 | A1 * | 6/2002 | Machida ..................... | 717/174 |
| 2002/0174206 | A1 * | 11/2002 | Moyer et al. ............... | 709/221 |
| 2003/0033452 | A1 * | 2/2003 | Himmel et al. ............. | 710/9 |

OTHER PUBLICATIONS

Windows 2000 Quick Fixes, Jim Boyce, section 2.3.*
Windows 98 Unleased, Paul McFedries, Section: Working with the Device Manager.*
Carl-Uno Manros, *The Internet Printing Protocol (IPP)*, date unknown.
Don Wright, *Internet Printing Protocol: Requirements* (slide show and notes), date unknown.
*Novell Distributed Print Services*(SM) White Paper, Novell, Inc. (1997).
*Java™ Network Launcher Protocol & API Specification, Version 1.0*, Java Software, a Division of Sun Microsystems, Inc. (Jun. 1, 2000).
*The Java Community Process*(SM) *Program—JSRs: Java Specification Requests—Detail—JSR 56: Java Network Launching Protocol and API*, <http://www.jcp.org/jsr/detail/56.prt>, date unknown.

* cited by examiner

*Primary Examiner*—Alan Chen
(74) *Attorney, Agent, or Firm*—King & Schickli, PLLC

(57) ABSTRACT

A method and apparatus for maintaining a computing device is provided. An indication of an end of persistence for a peripheral device is received. Monitoring is performed for an event related to the end of persistence. Support information associated with the peripheral device is removed from the computing device based on detection of the event related to the end of persistence.

17 Claims, 5 Drawing Sheets

- HTML for IE installation
  ```
  <OBJECT
  CLASSID="clsid:367231f97-7aa0-11d4-8919-FF2D71D0D32C"
  CODEBASE="IENIPP.OCX">
  <PARAM NAME=operation VALUE=op-printer-install>
  <PARAM NAME=printer-url VALUE=http://serverDNSname/ipp/hp4500>
  <PARAM NAME=result-type VALUE=msgBox>
  </OBJECT>
  ```

- HTML for Netscape installation
  ```
  <EMBED TYPE=application/x-Novell-ipp
  width=100 height=30
  operation=op-printer-install
  printer-url=http://serverDNSname/ipp/hp4500
  result-type=msgBox
  driver-options=papersize=A4;copies=1;color=TRUE;
  persistence=volatile-date-time:2001,3,22,8,30
  target-frame=_new>
  ```

FIG. 5

METHOD AND APPARATUS FOR MAINTAINING PERIPHERAL DEVICE SUPPORT INFORMATION

FIELD OF THE INVENTION

The present invention relates to maintaining relationships between a computing device and a peripheral device and, more particularly, to a method and apparatus for automatically removing support information from a computing device.

BACKGROUND OF THE INVENTION

Conventionally, before a computing device can use a peripheral device, some setting up must take place at the computing device. This setup process is referred to hereinafter as installation of the peripheral device. For example, the computing device might need to know some information about the peripheral device being installed and/or the computing device might need to know some information regarding, for example, how to activate the peripheral device, and how to configure and control information sent to or received from the peripheral device (referred to hereinafter collectively as "support information"). Oftentimes, at least some of this support information is provided to the computing device in the form of configuration files and/or an installed set of executable instructions known as a device driver (e.g., a printer driver). The device driver can then be utilized with, for example, a processor and operating system of the computing device to activate and use the peripheral device. Accordingly, different device drivers are typically made available for different combinations of peripheral devices, operating systems, and/or processors.

In some cases, it is undesirable to continually maintain such support information on a computing device. For example, when the relationship between a computing device and a peripheral device is transient in nature (e.g., the user is merely visiting the location in which the peripheral device is located), the user of the computing device and/or the administrator responsible for the peripheral device might not want such support information to be maintained on the computing device. A user of a computing device might also want to avoid keeping such support information in an effort to help keep the number of peripheral devices associated with the computing device manageable and/or to remove invalid peripheral devices from the computing device.

SUMMARY OF THE INVENTION

In one embodiment, the present invention relates to a method for maintaining a computing device. An indication of an end of persistence for a peripheral device is received. Monitoring is performed for an event related to the end of persistence. Support information associated with the peripheral device is removed from the computing device based on detection of the event related to the end of persistence.

In another embodiment, the present invention relates to a computing device having memory and a provider set of executable instructions. The provider set of executable instructions are operable to receive an indication of an end of persistence for a peripheral device capable of being operably connected to the computing device, to monitor for an event related to the end of persistence, and to remove support information associated with the peripheral device from the memory based on detection of the event related to the end of persistence.

Still a further embodiment of the present invention relates to a system including a peripheral device and a computing device. The computing device has memory and is capable of accessing the peripheral device. The computer device is operable to receive an indication of an end of persistence for the peripheral device, to monitor for an event related to the end of persistence, and to remove support information associated with the peripheral device from the memory based on detection of the event related to the end of persistence.

These and additional advantages and novel features of the present invention will become apparent to those skilled in the art from the following detailed description, which is simply, by way of illustration, various modes contemplated for carrying out the invention. As will be realized, the invention is capable of other different aspects, all without departing from the invention. Accordingly, the specification is intended to be illustrative in nature and not restrictive.

BRIEF DESCRIPTION OF THE DRAWINGS

While the specification concludes with claims particularly pointing out and distinctly claiming the present invention, it is believed that the same will be further understood from the following description taken in conjunction with the accompanying drawings in which:

FIG. 5 is sample code illustrating an interface between an HTML file and a supplemental component according to an illustrative embodiment of the present invention.

Figure 1:
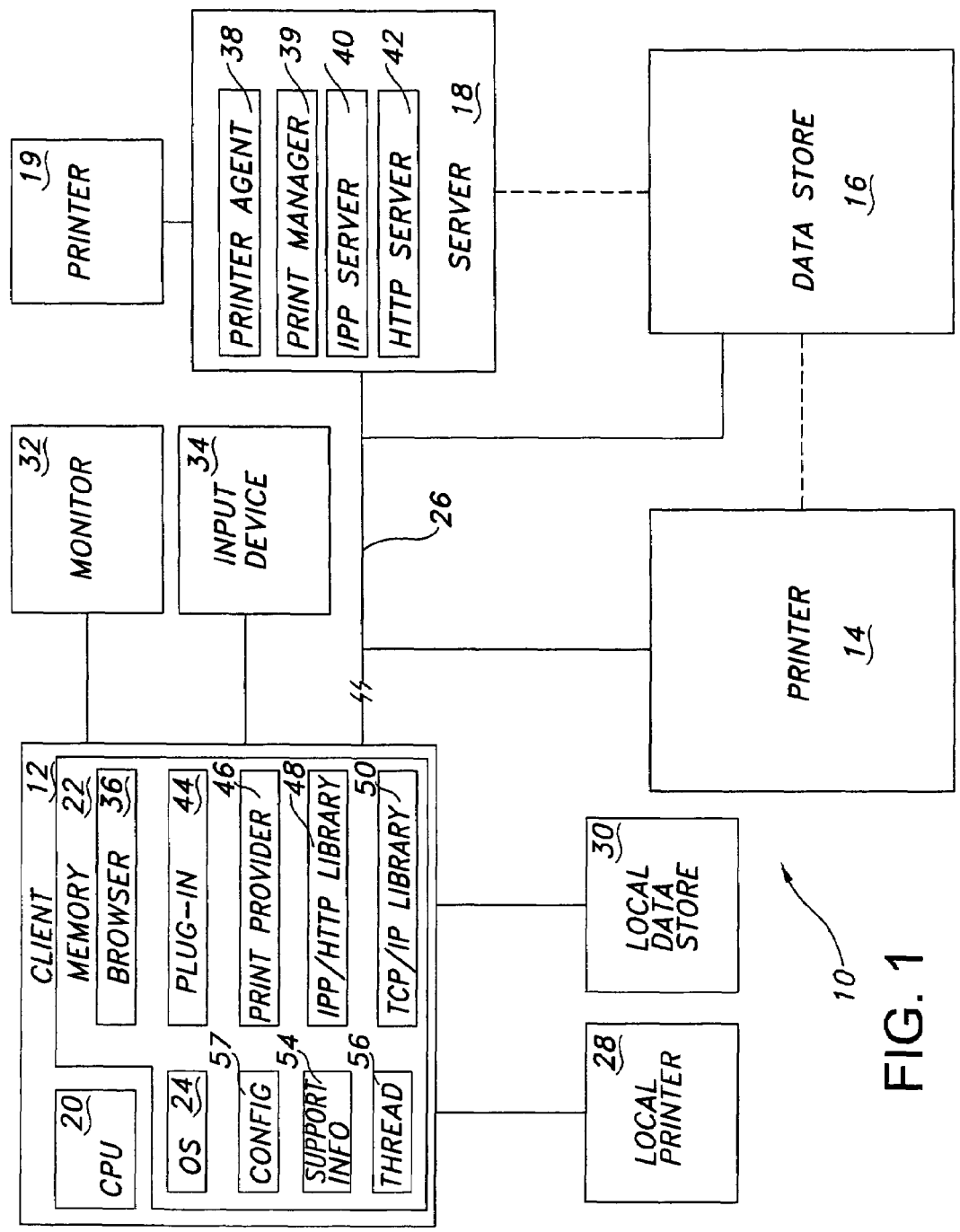
FIG. 1 is a schematic diagram of a system in which one embodiment of the present invention can be utilized.

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION

One embodiment of the present invention relates to maintaining peripheral device support information associated with a computing device. For purposes of illustration only, the exemplary description presented herein will focus on such an embodiment wherein the computing device is a general purpose computer and the peripheral device is a printer. As can be appreciated, however, the teachings of the present invention could be extended to embodiments wherein the computing device is something other than a general purpose computer (e.g., a special purpose computer, a personal digital assistant, a digital telephone, a photo printer, a printer, a facsimile apparatus, a storage device, a portable digital audio player, a scanner, a camera, a video recorder, a cable box, a satellite receiver, a stereo, a radio, a television, a digital versatile disk ("DVD") player, a video cassette recorder ("VCR"), and the like) and/or the peripheral device is something other than a printer (e.g., a special purpose computer, a personal digital assistant, a digital telephone, a photo printer, a facsimile apparatus, a storage device, a portable digital audio player, a scanner, a camera, a video recorder, a cable box, a satellite receiver, a stereo, a radio, a television, a digital versatile disk ("DVD") player, a video cassette recorder ("VCR"), and the like).

FIG. 1 is a schematic block diagram of a network 10 comprising a collection of interconnected computing devices, in which certain embodiments of the present invention might be utilized. As can be appreciated, aspects of the present invention can also be utilized in embodiments wherein computing devices are not interconnected. Referring, however, to the embodiment illustrated in FIG. 1, computer 12 in network 10 might comprise a processor, such as central processing unit (CPU) 20, memory 22 and an input/output (I/O) unit (not shown), which may be interconnected by a system bus (not shown).

Memory 22 may comprise, for example, storage locations composed of random access memory (RAM) devices that are addressable by CPU 20 and the I/O unit. An operating system (OS) 24, portions of which could be resident in memory 22 and executed by CPU 20, can be used to functionally organize computer 12 by, inter alia, invoking network operations in support of application programs (e.g., browser application 36) executing on the CPU. It will be apparent to those skilled in the art that other processor and memory means, including various computer readable media, may be used to, for example, store and execute instructions pertaining to the inventive method and apparatus described herein.

The I/O unit can connect computer 12 to a transmission medium 26, and oftentimes, to a mass storage device, such as local data store 30, and/or local printer 28. The I/O unit can receive information, such as control and data signals, from an input device 34 (e.g., a keyboard or mouse) and/or provide that information to CPU 20 for storage/retrieval of information to/from date store 30, for output to printer 28 and/or for transfer/retrieval over transmission medium 26.

Transmission medium 26 may comprise, for example, a local area network (LAN) or a collection of LANs cooperating to form a larger network, such as the Internet. Collectively, the LANs may be configured to form a topology of internetworked computing devices that communicate by exchanging data packets according to a predefined set or protocols. Communication among the computing devices may be effected by reliable communication over, for example, Transmission Control Protocols/Internet Protocol (TCP/IP) sessions. It should be noted that other conventional techniques and protocols, such as Remote Procedure Calls (RPC) or the Internet Packet Exchange (IPX) protocol, may also be used with embodiments of the present invention.

Although aspects of the present invention can be used in a variety of network architectures, including a peer-to-peer network, in the embodiment illustrated in FIG. 1, network 10 is organized in accordance with a client-server architecture, wherein computer 12 may comprise a personal computer or workstation configured as a "client" (computer 12 will hereinafter be referred to by example as client 12) for interaction with users and computing device 18 is configured as a "server" (computing device 18 will hereinafter be referred to by example as server 18) that performs services directed by the client. For example, server 18 may be configured as a print server having a locally-attached printer 19. In another embodiment of the invention, a printer 14 may be directly-attached to transmission medium 26.

In one exemplary embodiment of the present invention, for example, server 18 might include components such as printer agent 38 and print manager 39. When embodied in software, these components could, for example, generally interact with an operating system on server 18, such as the NetWare operating system available from Novell, Inc., to provide a print server configured to provide print services to client 12 of network 10. For example, printer agent 38 can be a software component executing on a server representing a local, remote or network-attached printer. In another embodiment, a printer agent may be embedded into a printer, such as printer 14, which can be arranged to attach directly to network 10.

Printer agent 38 manages a physical print device, such as printer 19, for example (or a print function of a multi-function device). Printer agent 38, for example, might embody the printer, print queue, print server, and spooler functions associated with conventional queue-based printing. Printer agent 38 might be a component of a printing architecture, such as the Novell Distributed Print Services (NDPS) printing architecture. One potential advantage of using NDPS might include that the components of the NDPS architecture are independent of any single protocol or operating system and, as such, may be ported to different environments based, for example, upon the International Standards Organization 10175 Document Printing Application standard and Internet Engineering Task Force RFC 1759.

According to one exemplary embodiment, printer agent 38 may be implemented as part of print manager 39, such as the NDPS manager component of the NDPS architecture. A NDPS manager can manage a printer agent, such as to enable creation of the printer agent and to enable such an agent to share resources. For example, a NDPS manager can manage and support one or more printer agents running at a node by providing common support and access for naming, protocol, file, object database, and other network services. A NDPS manager can be a NetWare Loadable Module (NLM) that runs on a NetWare print server. An agent 38 may further be embodied as a software application configured to run in other environments, such as one including an OS such as the Windows 9x, 2000, ME, XP, or NT, or DOS, Unix, Linux or Apple OSs, or embedded directly into a printer or print server apparatus.

Other components (not shown) of the NDPS architecture might include, for example, a printer device subsystem (PDS), a port handler (PH) and a printer gateway, the latter comprising a software bridge that directly links a printer agent to a corresponding printer. For example, a PDS can be an NLM that resides in memory on a print server and retrieves printer-specific information from local storage on the server. A PDS might be used to create a printer agent for a printer which is not directly attached to a network and for a printer that is directly attached to the network, but that does not include an NDPS gateway, for example. A PH might be used to ensure that the PDS can communicate with a printer regardless of the type of physical port or interface being used.

Printer agent 38 can also be an NLM that contains information about a printer it represents. Such information might include a printer's network address, name, status or other characteristics, and can be communicated to client 12 and managed by a system administrator. Printer agent 38 can support central management of printers on network 10, as well as the creation and management of print jobs. In one view, printer agent could thus be seen as a liaison between a client and a printer, so that each print request goes from the client to the printer by way of the printer agent.

Printer agent 38 might receive requests from and send replies to client 12 in compliance with a protocol, such as the IPP protocol. As noted, the NDPS architecture can be protocol-independent and may support other protocols, such as the Hypertext Transfer Protocol (HTTP), the LPR protocol or the RPC Protocol, instead of or in addition to IPP.

Figure 2:
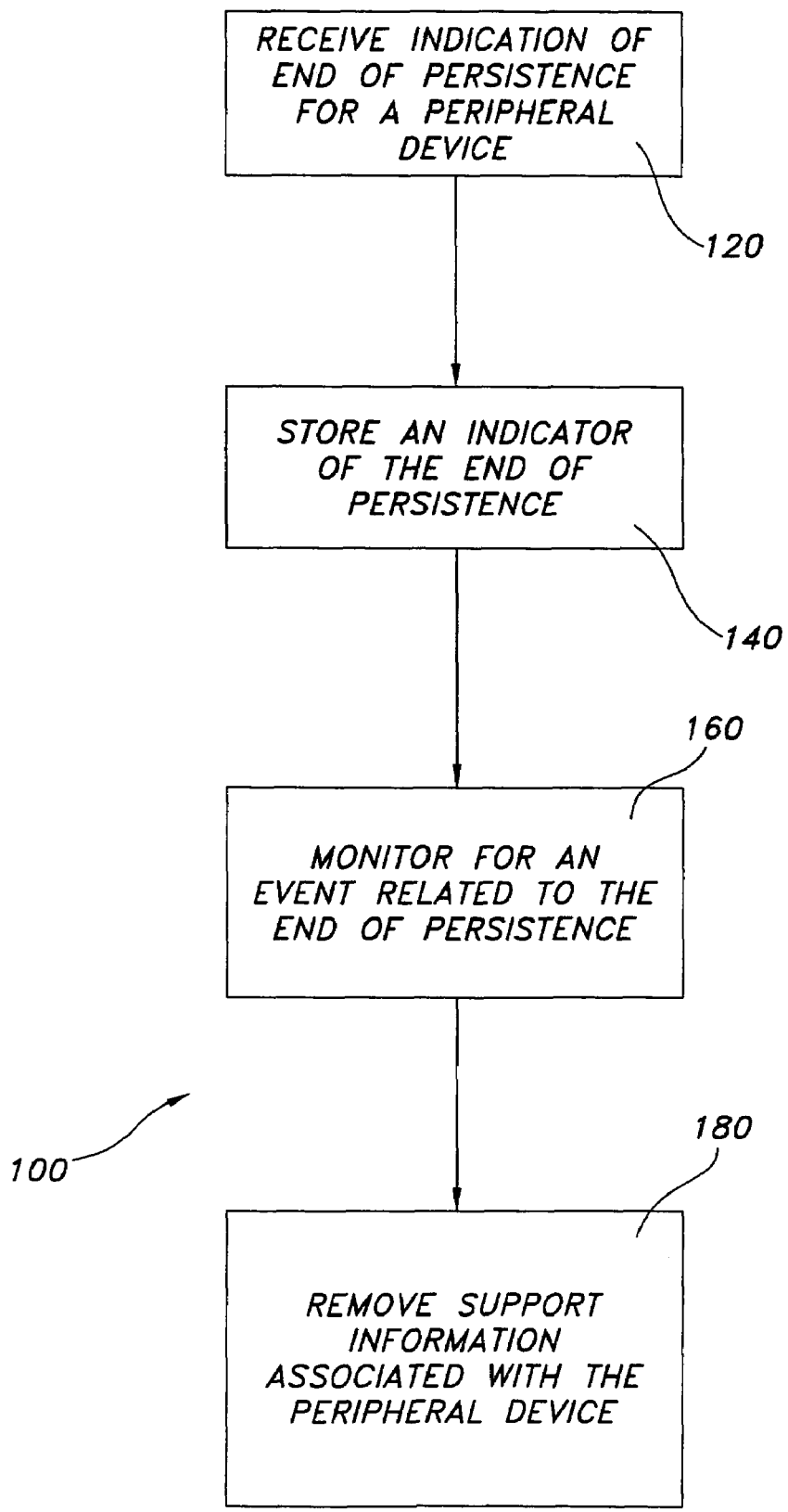
FIG. 2 is a flow diagram of a method for maintaining peripheral device support information according to an illustrative embodiment of the present invention.

Referring to FIG. 2, one exemplary embodiment of the present invention is related to a method 100 for maintaining peripheral device support information associated with a computing device. According to method 100, at act 120, a computing device might receive an indication of an end of persistence for a peripheral device associated with or capable of being associated with the computing device. At act 140, the computing device might store an indicator of the end of persistence. At act 160, the computing device could monitor for an event related to the end of persistence. At act 180, the support information associated with the peripheral device is removed.

An exemplary embodiment of one such method will now be described in more detail with respect to the apparatus illustrated in FIG. 1, wherein client 12 is a computing device and printers 14, 19 are peripheral devices. An end of persistence for a printer is identified. In one embodiment, the end of persistence can be selected from a list of options (e.g., via a web-based management tool). For example, the end of persistence might be selected from one of the following options: reboot, login, a specified time, an elapsed period of time, after X print jobs, expiration of account balance, forever, etc. The end of persistence could be selected, for example, by an administrator of the peripheral device, a user of the computing device, or by default.

As can be understood, support information might be removed based on the detection of any one of a plurality of events that might be related to an end of persistence. For example, an end of persistence might be related to an event or events that are not related to the computing device and/or the user. For example, support information for a printer might be removed based on the determination that the computing device can no longer access the printer (e.g., when an administrator of a network temporarily or permanently removes a printer from a network). According to one such embodiment, a user of the computing device from which the support information will be removed might be prompted to confirm that the support information should be removed before removing the same.

Figure 3:
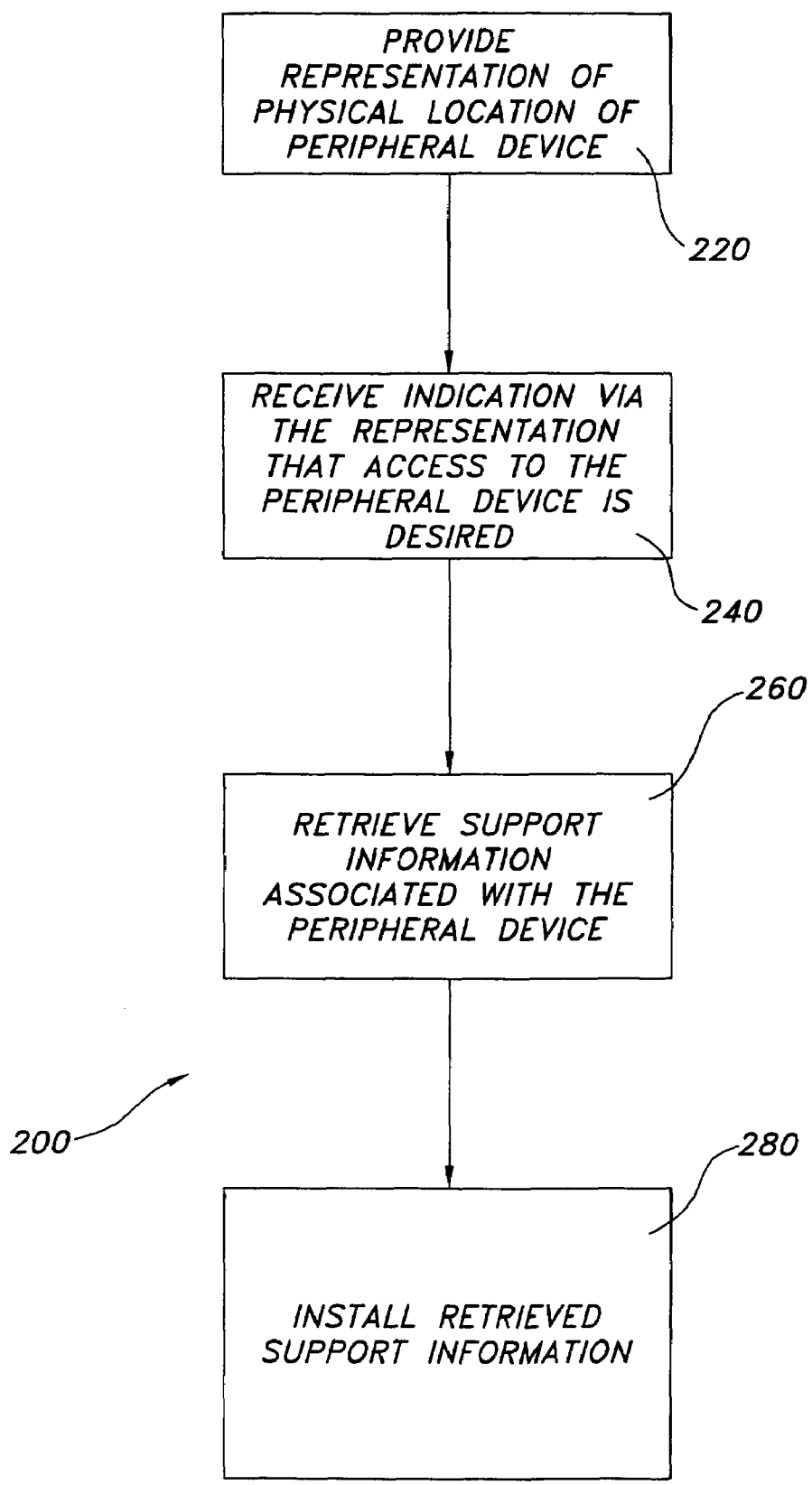
FIG. 3 depicts a flow diagram of a method for installing support information according to an illustrative embodiment of the present invention.

In one embodiment, the identified end of persistence is set during installation of the printer onto client 12. Referring now to FIG. 3, a method 200 of installing a peripheral device is provided that can be used with an embodiment of the present invention. For example, at act 220, a representation of the physical location of the peripheral device can be provided. At act 240, an indication is received via the representation that access to the peripheral device is desired. Based on the indication, support information associated with the peripheral device can be retrieved, as shown in act 260. The support information can be installed on the computing device, as shown in act 280.

For example, referring again to the apparatus shown in FIG. 1, printer 14 or 19 could be installed onto client 12 using an installation interface that can be accessed by multiple computing devices, even if those computing devices may have different environments (e.g., different hardware components and/or operating systems). One approach to such an embodiment might include providing the installation interface in the form of a file written in a mark-up language, such as the hypertext mark-up language ("HTML"). Such a file can be stored on a server or printer, for example, or can be stored in a data store accessible by a web server, for example. According to one embodiment, a computing device such as client 12 can run an appropriate browser application (e.g., browser 36) that provides access to the installation interface. For example, one such browser might include the Internet Explorer™ browser currently marketed by the Microsoft Corporation of Redmond, Wash.

Figure 4:
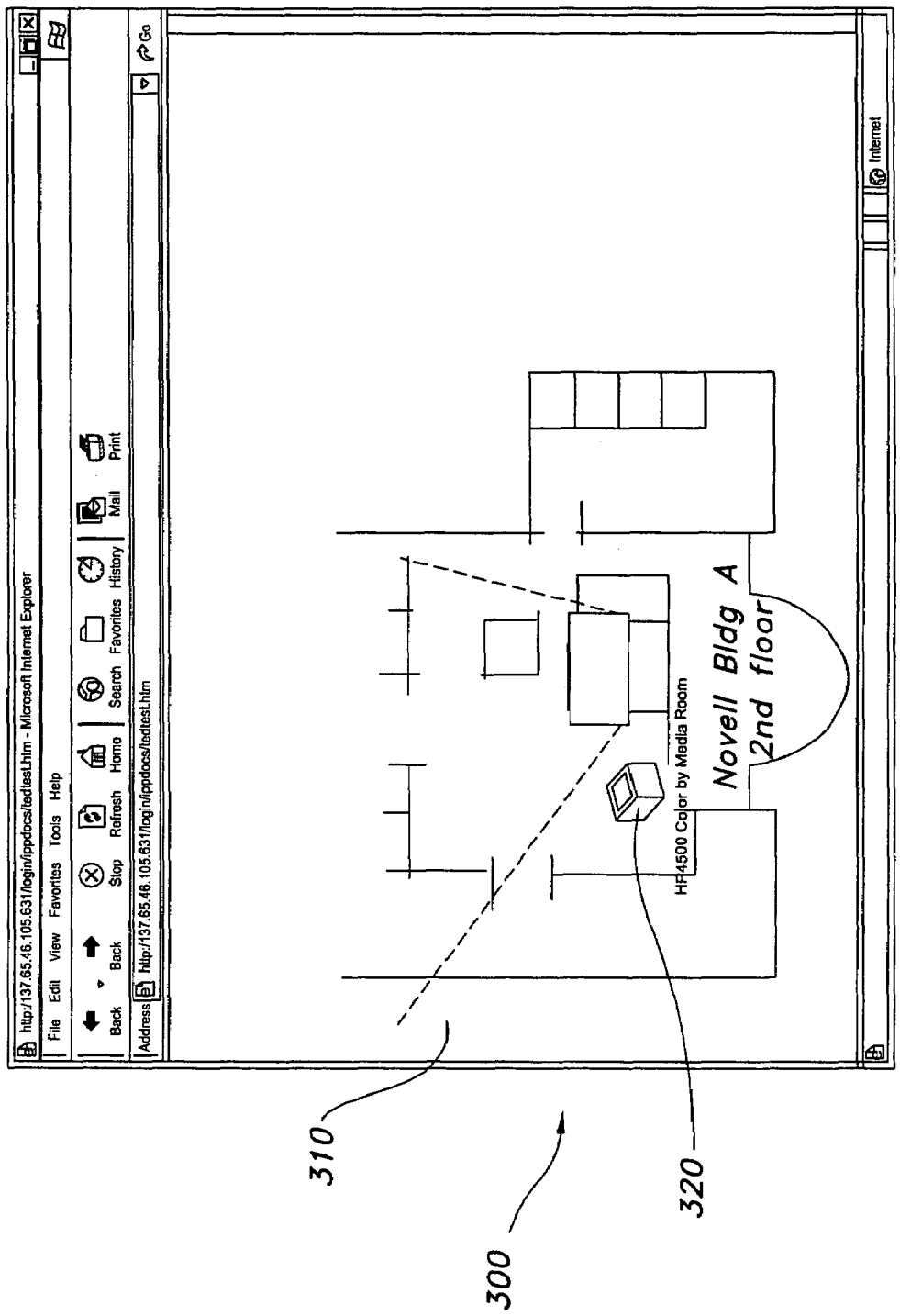
FIG. 4 depicts an installation interface according to an illustrative embodiment of the present invention.

Referring now to FIG. 4, according to one exemplary embodiment of the present invention, installation interface 300 comprises a representation 310 of the physical location of a printer in relation to an area encompassing that location. For example, representation 310 might comprise a graphics-based representation, such as one wherein the printer is represented by an associated icon 320 arranged on a map of the area in accordance with its actual physical location. In an exemplary embodiment, icon 320 might comprise a graphical representation of the printer and/or a character-based description of the printer.

According to one embodiment of the present invention, if a user of client 12 desires to perform some operation related to a printer (e.g., printing to the printer), the user might indicate that desire via the client. In an embodiment wherein the representation comprises a graphics-based representation (such as representation 310) on a display device (e.g., monitor 32) associated with client 12, and the client is associated with an input device capable of providing input information to the client (e.g., a pointing device, such as a mouse), the user might use the input device to indicate the printer (e.g., by clicking on the icon of the desired printer) to which the operation is related. For example, a user of client 12 might desire to print using printer 14 or 19. In an exemplary embodiment of the present invention, the acts necessary to perform the desired operation are performed in response to an indication received from the user while viewing the representation.

Further according to one such exemplary embodiment, representation 310 can be provided in the form of an HTML file allowing a user viewing the representation (e.g., via browser 36) to select a printer and, in response, retrieve and install (if necessary) support information (e.g., a printer driver, font metric file, and configuration files and information, such as Postscript Printer Description ("PPD") files, Generic Printer Description ("GPD") files, and/or administrator-selected settings) to allow client 12 to access the printer.

For example, with reference to FIGS. 1 and 4, icon 32 can be linked to instructions for performing the respective retrieving and installation operation(s), such that appropriate instructions are invoked upon a selection of a printer by the user. According to one exemplary embodiment of the present invention, the selection of icon 320 may invoke another HTML file specific to the selected printer (which might be stored on the printer, a server associated with the printer, or a data store). When accessed by browser 36, the printer-specific HTML file causes the identified end of persistence to be set, and retrieves and installs the support information onto client 12.

Current conventional browsers are limited in their functionality with respect to interactions with computing devices. Accordingly, in one embodiment of the present invention, a supplemental component is provided on client 12 that allows actions related to a printer to be taken on computing devices. Such a supplemental component might comprise, for example, ActiveX controls, Netscape plug-ins, and the like, and will hereinafter be referred to by example as plugin 44. Plugin 44 can serve as an HTML interface to commands and functions related to the printer.

For example, an indication might be provided within the printer-specific HTML file that, when acted on by browser 36, invokes plugin 44. In an exemplary embodiment, for example, the printer-specific HTML file might include an embedded instruction (e.g., with Netscape, the HTML element <EMBED>; with Internet Explorer, the HTML element <OBJECT>) that, when processed by browser 36, invokes plugin 44 to cause the identified end of persistence to be set. In an embodiment where end of persistence is set during installation, the embedded instruction might also be used to invoke a plugin to cause appropriate support information to be retrieved and/or installed on client 12. In an exemplary embodiment, plugin 44 is used to set the end of persistence, and to retrieve and install the support information.

For example, FIG. 5 represents sample HTML code for use with the Internet Explorer browser and HTML code for use with the Netscape Navigator browser. Both samples illustrate a way in which to interface with a plug-in. As illustrated, the sample Netscape HTML code passes a parameter corresponding to the end of persistence to the plugin. For example, in the Netscape code, this is illustrated by the command line "persistence=volatile-date-time:2001, 3,22,8,30." Accordingly, the plug-in will cause the identified printer to be installed on the client and the printer will be removed from the client at 8:30 AM on Mar. 22, 2001.

The plug-in can also be passed other parameters related to operations of the printer. For example, the sample code for Internet Explorer passes the parameters operation, printer-url, and result-type to the plugin (shown in the sample code as ienipp.ocx). According to the illustrated embodiment, the operation parameter is used to tell the plug-in which operation (e.g., op-printer-install) to perform. The op-printer-install operation, for example, installs the indicated printer (see below) to the client. The printer-url parameter is used to indicate to which printer the operation should be directed (e.g., the Internet Printing Protocol compliant printer associated with the uniform resource locator ("URL") http://serverDNSname/ipp/hp4500).

The result-type parameter is used to tell the plug-in how to report the results of the requested operation. For example, the sample code is telling the plug-in to report the results of the installation operation to the user via a message box. A further list of exemplary parameter identifiers and supported operations that can be used to define an interface between an HTML page and a plugin can be found in Appendix A of the document entitled "iPrint Administration Guide", Novell, Inc., July 2001 (which can be accessed by the URL http://www.novell.com/documentation/lg/nw6p/index.html), which is hereby incorporated by reference.

Plug-in 44 can call into client 12 to perform the desired operation (e.g., setting persistence, retrieving and installing support information, etc.). For example, in one exemplary embodiment, a print provider 46 is installed on client 12 and plug-in 44 calls into the print provider to perform the operation. According to such an embodiment, plugin 44 acts as a communication conduit from browser 36 to print provider 46.

Print provider 46 can be used to set the end of persistence and/or to retrieve and install the printer on client 12. Among other features, print provider 46 can also be used to allow printing from applications running on client 12 and to provide a standard set of printer folder operations (e.g., add/delete printers, set default, pause/resume printer, list/delete jobs, etc.). As one of the exemplary embodiments described herein has been discussed in terms of setting persistence during installation, installation according to an exemplary embodiment of the present invention will now be discussed.

In one embodiment, print provider 46 utilizes commands and functions compliant with the Internet Printing Protocol ("IPP") to communicate with respect to a printer (e.g., with printer agent 38). For example, print provider 46 can be used to translate OS-dependent requests to IPP requests and to send those requests to an appropriate IPP server. IPP is an application level protocol that can be used for distributed printing using internet tools and technologies. IPP can, for example, provide a universal way for a user to find out about the capabilities of a printer, submit a print job to a printer, check on the status of a printer or print job, and cancel a print job. Utilizing IPP, a printer located anywhere on the Internet can be made accessible to a computing device.

In an embodiment utilizing IPP, appropriate support is provided on client 12 in the form of an IPP library (i.e., support is provided for the protocol functions and commands in the environment of the client). IPP is currently built on top of the HyperText Transfer Protocol ("HTTP"). HTTP defines how messages are formatted and transmitted, and what actions Web servers and browsers, for example, should take in response to various commands. For example, IPP traffic is sent as a Multipurpose Internet Mail Extensions (MIME)-type using HTTP's feature for posting information. Currently, IPP is transferred using the HTTP/1.1 protocol, which has the ability to perform multiple transfers over a single Transmission Control Protocol ("TCP") connection and is currently the most widely accepted protocol in the Internet marketplace. Accordingly, appropriate support is also provided on client 12 in the form of an HTTP library, which can be combined with the IPP library in one embodiment (e.g., IPP/HTTP library 48).

HTTP currently runs over TCP/IP. TCP/IP is a communications protocol wherein TCP provides transport functions that ensure that the total amount of bytes sent is correctly received. TCP enables two hosts to establish a connection and exchange streams of data. TCP guarantees delivery of data and that the packets will be delivered in the same order in which they were sent. Meanwhile, the IP part provides routing capabilities. Accordingly, appropriate support is also provided on the client in the form of a TCP/IP library 50 (e.g., Winsock). Additional support can also be provided to enable use of other potentially advantageous protocols, such as the Secure Sockets Layer ("SSL") and Transport Layer Security ("TLS") security protocols.

In accordance with one exemplary embodiment, during an installation operation, for example, print provider 46 can be adapted to query a printer to be installed (or a server corresponding to the printer) to filter out appropriate support information from the support information made available to all potential clients of the printer. For example, print provider 46 might query an IPP server 40 (e.g., via HTTP server 42) associated with server 18 with an IPP request to filter out appropriate support information for client 12 from the support information made available to all potential clients of printer 19. In an embodiment utilizing NDPS, IPP server 40 can receive such an IPP request, translate the request to NDPS and send the request to print manager 39.

According to one embodiment of the present invention, IPP server 40 enables access to all of the printers associated with print manager 39. IPP server 40 can comprise a software module running on a server (e.g., server 18) or a printer (e.g., printer 14). For example, IPP server 40 could comprise a NLM, which could be written in any one of a number of programming languages, such as Visual Basic, Java, C, C++, or PERL. An IPP server could be registered as a Common Gateway Interface ("CGI") process, for example.

In an exemplary embodiment, print provider 46 and IPP server 40 are in compliance with the printer installation extension of IPP, which is documented in the Internet Engineering Task Force (IETF) Internet Draft entitled "Internet Printing Protocol (IPP): Printer Installation Extension" (Jul. 17, 2001), and which is hereby incorporated by reference. According to one such embodiment, IPP server 40 uses the printer description attribute "client-print-support files-supported" to represent relevant information about all of the support files available for the printer it supports. Fields of this attribute could include, for example, those identifying the URI (e.g., according to one of the ftp, http, or ipp schemes) of where to obtain the support files for each operating system, processor, document format, and natural language a printer supports, the operating system types, processor types, document formats, and natural languages supported by the set of support files, the mechanism used to compress the set of support files, the type of the support files (e.g., printer-driver, ppd, updf, and gpd), and the name by which the support files will be installed on a client. Additional fields of this attribute could also include those identifying the policy for automatic loading, the file size, the version number, the creation date and time, human readable text describing the set of support files, and the mechanism used to ensure the integrity and authenticity of the set of support files.

Values of an exemplary "client-print-support-files-supported" printer description attribute might include, for example:

uri=ipp://mycompany.com/myprinter?drv-id=ModelY.gz<
   os-type=windows-95<cpu-type=x86-32<
   document-format=application/postscript<
   natural-language=en<compression=gzip<
   file-type=printer-driver<
   client-file-name=CompanyX-ModelY-driver.gz<
   policy=manufacturer-recommended<

According to one such embodiment, print provider 46 could issue a Get-Printer-Attributes request to IPP server 40, wherein the "client-print-support-files-filter" operation attribute is supplied in the request as a filter. According to such an embodiment, the filter value indicates in which support files print provider 46 is interested. Filter values provided by print provider 46 can include uri-scheme (e.g., ftp, http, and ipp), type of operating system, type of processor, document format, and natural language. In an exemplary embodiment, IPP server 40 returns only the values of the "client-print-support-files-supported" printer description attribute that match the filter. An example of a "client-print-support-files-filter" filter value could be:

os-type=windows-95<cpu-type=x86-32<
   document-format=application-postscript<natural-language=en,de<

A matching response might be the following string values:
uri=ipp://mycompany.com/myprinter?drv-id=ModelY.gz<
   os-type=windows-95<cpu-type=x86-32<
   document-format=application/postscript<
   natural-language=en<compression=gzip<
   file-type=printer-driver<
   client-file-name=CompanyX-ModelY-driver.gz<
   policy=manufacturer-recommended<
   digital-signature=smime<
uri=ftp://mycompany.com/root/drivers/win95/CompanyX/ModelY.gz<
   os-type=windows-95<cpu-type=x86-32<
   document-format=application/postscript,application/vnd.hp-PCL<
   natural-language=en,fr<compression=gzip<
   file-type=printer-driver<
   client-file-name=CompanyX-ModelY-driver.gz<
   policy=manufacturer-recommended<
   digital-signature=smime<

If the above request had also contained the "uri-scheme" field in the filter, such as uri-scheme=ipp<, then only the first value would have been returned.

Accordingly, print provider 46 can receive a list of the potential support files that meet the requirements of client 12. Print provider 46 can then choose from the returned list which of the support files to use and know where to get them. For example, IPP server 40 might be queried to identify the support information that corresponds to the environment of client 12 (e.g., operating system, processor, preferred natural language, and preferred document format, for example, a page description language (PDL) such as Postscript of PCL).

If one of the URIs returned is, for example, an IPP URI, print provider 46 can retrieve the support files from the corresponding IPP resource via, for example, a Get-Client-Print-Support-Files operation. According to such an embodiment, IPP server 40 returns a "client-print-support-files-supported" attribute that identifies the properties of the returned support files and the support files that match the request. Moreover, print provider 46 might also retrieve the support files through other means, such as by using an FTP Get of HTTP Get operation.

Although the support information can be stored on a printer and/or a server associated with a printer, such information might also be stored and downloaded from repositories of different sorts, such as data store 16. In an exemplary embodiment, the support information is stored in a central repository for network resources, such as the Resource Management System available from Novell, from which print manager 39 can obtain the support information. Data store 16 may also be configured as a database for storing information relating to, e.g., objects that represent components of a printing architecture that may be advantageously used with the present invention.

According to one embodiment of the present invention, the support information for a particular client is compressed into a single file. For example, the support information can be stored in a zip format. In a further exemplary embodiment, when the support information is compressed into a single file, the file is time-stamped (e.g., with the date and time of the creation of the single file). In still a further embodiment of the present invention, the support information is stored with an in-memory index, which can speed download times.

In such an embodiment, print provider 46 could compare the time-stamp of the support information with a time-stamp associated with support information already installed on client 12 (e.g., such a time-stamp could be stored on a database of configuration information associated with the client) before downloading the support information. For example, if the time-stamp of the existing support information is later than the time-stamp of the newly identified support information, then the downloading of the newly identified support information can be avoided.

In a further embodiment, upon receiving an indication that access to a peripheral device is desired, a determination is made as to whether any components (e.g., print provider 46 and/or plug-in 44) are needed on client 12. If needed, the components can, for example, be pushed to client 12 via a compressed file that automatically decompresses and installs itself.

In one embodiment, after support information is downloaded, print provider 46 can read any information files, add the support information (e.g., a printer driver) to client 12, add the printer to the client (e.g., by installing the printer in the Windows printer file), and finalize any printer driver settings. With respect to the end of persistence, print provider 46 can, for example, write a setting to a database of configuration settings 52 associated with the client (e.g., the local machine of the Windows Registry database). For example, in an embodiment where client 12 is running a Windows operation system, if the end of persistence has been set to a particular time and date, that time and date can be written to the Registry database. Print provider 46 can monitor for an event corresponding to the identified end of persistence, and remove the printer and associated support information 54 from the client when that event is triggered.

For example, print provider 46 can cause an event monitoring thread 56 to be run on client 12. According to an exemplary embodiment, thread 56 is run in the background. Event monitoring thread 56 can be started each time client 12 is rebooted. In an exemplary embodiment, event monitoring thread 56 is started when a spooler mode or printer spooler loads on client 12.

In an embodiment wherein client 12 utilizes a Windows operating system, event monitoring thread 56 can, for example, monitor the Registry database to see if the event related to the identified end of persistence has come to pass. In one embodiment, event monitoring thread 56 always monitors, for example, the Registry database. In another embodiment, event monitoring thread 56 periodically monitors, for example, the Registry database (e.g., once every 15 seconds, once every hour, etc.). When the event comes to pass or is triggered, event monitoring thread 56 removes the printer and its associated support information from client 12.

For example, in an embodiment wherein the end of persistence has been set as a specific date and time, the date and time can be stored in configuration settings database 52. Event monitoring thread 56 monitors current time versus the time written to database 52. When the current time becomes equal to the time written in database 52, thread 56 removes the printer and its associated support information.

A further example is now given wherein the end of persistence has been set to reboot. According to such an embodiment, thread 56 checks to see if client 12 has been rebooted since the printer and its associated support information was installed. If so, thread 56 removes the printer and its associated support information.

Among other advantages, embodiments of the present invention can allow mobile employees, business partners, and customers, for example, to access a peripheral device from a variety of locations (including remote locations), such as by using an Internet connection. Moreover, such access can be provided without having to involve an administrator, for example, on configuration issues. Furthermore, according to an exemplary embodiment of the present invention, support information installed on a computing device to enable such access can be scheduled for automatic removal.

The specific illustrations and embodiments described herein are exemplary only in nature and are not intended to be limiting of the invention defined by the claims. The illustrations and embodiments are not intended to be exhaustive nor to limit the invention to the precise form disclosed. Many alternatives, modifications, and variations will be apparent to those skilled in the art in light of the above teaching. Accordingly, the present invention is intended to embrace all alternatives, modifications, and variations that fall within the spirit and broad scope of the attached.

We claim:

1. A method for maintaining a computing device connected or not to a peripheral device, comprising:
    installing the peripheral device on the computing device;
    receiving an indication of an end of persistence for the peripheral device regardless of whether the peripheral device is connected to the computing device;
    by the computing device, monitoring for an event related to the end of persistence;
    by the computing device, fully automatically removing support information associated with the peripheral device based on detection of the event related to the end of persistence, wherein the monitoring and the fully automatically removing support information occurs regardless of whether the computing device is networked or maintains a network connection, wherein the installing the peripheral device includes
    providing a representation of a physical location of the peripheral device in relation to an area encompassing the physical location of the peripheral device;
    receiving an indication via the representation that access to the peripheral device is desired;
    retrieving support information associated with the peripheral device; and
    installing the retrieved support information on the computing device, wherein the removing support information comprises removing the support information retrieved and installed on the computing device.

2. The method for maintaining a computing device according to claim 1, further comprising the act of storing an indicator of the end of persistence.

3. The method for maintaining a computing device according to claim 2, wherein the act of storing an indicator comprises storing the indicator in a database of configuration settings associated with the computing device.

4. The method for maintaining a computing device according to claim 3, wherein the act of monitoring for an event comprises monitoring the database of configuration settings associated with the computing device.

5. The method for maintaining a computing device according to claim 1, wherein the act of monitoring for an event comprises running an event monitoring thread.

6. The method for maintaining a computing device according to claim 5, further comprising booting the computing device and starting the event monitoring thread after booting the computing device.

7. The method for maintaining a computing device according to claim 1, wherein the providing the representation comprises accessing the representation via a browser application on the computing device.

8. The method for maintaining a computing device according to claim 1, wherein the peripheral device comprises a printing device and the retrieving support information comprises downloading the support information via a second computing device using requests in compliance with the Internet Printing Protocol.

9. The method for maintaining a computing device according to claim 8, wherein the second computing device comprises the printing device.

10. The method for maintaining a computing device according to claim 1, wherein the retrieving support information comprises querying a second computing device having access to a plurality of support information associated with the peripheral device to determine which of the plurality of support information is appropriate for the computing device.

11. The method for maintaining a computing device according to claim 10, wherein the computing device has an environment and the act of querying comprises the act of providing the second computing device an indication of the environment of the computing device, further comprising the act of receiving support information appropriate for the environment of the computing device.

12. A method for maintaining a computing device according to claim 10, further comprising the acts of:
   receiving an indication of temporal status of at least one file in the support information determined to be appropriate for the computing device;
   comparing the temporal status of the at least one file in the support information determined to be appropriate for the computing device with a temporal status of any corresponding one of the at least one file already installed on the computing device; and
   retrieving the at least one file in the support information determined to be appropriate if its temporal status is more recent than that of a corresponding one of the at least one files installed on the computing device.

13. The method for maintaining a computing device according to claim 1, wherein the retrieving support information comprises:
   receiving an indication of a location of support information appropriate for the computing device; and
   retrieving the appropriate support information from the location.

14. A method for maintaining a computing device according to claim 13, wherein the act of retrieving the appropriate support information from the location comprises using one of a File Transfer Protocol Get operation, a Hypertext Transfer Protocol Get operation, and a Internet Protocol Get-Client-Print-Support-Files operation to download the appropriate support information from the location.

15. A method for maintaining a computing device connected or not to a peripheral device, comprising:
   installing the peripheral device on the computing device by selection of a peripheral device icon provided in a representation of a physical location of the peripheral device in relation to an area encompassing the physical location of the peripheral device;
   setting an end of persistence of the peripheral device during the installing the peripheral device;
   receiving an indication of the end of persistence for the peripheral device regardless of whether the peripheral device is connected to the computing device;
   monitoring for an event related to the end of persistence;
   detecting the event; and
   by the computing device, fully automatically removing support information associated with the peripheral device based on the detecting.

16. The method of claim 15, wherein the monitoring for the event related to the end of persistence further includes assessing whether a volatile date and time has been reached.

17. A method for maintaining a computing device connected or not to a peripheral device, comprising:
   installing the peripheral device on the computing device by selection of a peripheral device icon provided in a representation of a physical location of the peripheral device in relation to an area encompassing the physical location of the peripheral device;
   receiving an indication of an end of persistence for the peripheral device regardless of whether the peripheral device is connected to the computing device;
   monitoring for an event related to the end of persistence;
   detecting the event; and
   by the computing device, fully automatically removing support information associated with the peripheral device based on the detecting.

* * * * *